(12) United States Patent
Goeddel

(10) Patent No.: US 6,546,026 B1
(45) Date of Patent: Apr. 8, 2003

(54) MULTI-DIVERSITY SYNCHRONIZATION TECHNIQUE FOR IMPROVING SYNCHRONIZATION PERFORMANCE IN WIRELESS APPLICATIONS OVER FADING CHANNELS

(75) Inventor: Thomas W. Goeddel, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/334,638

(22) Filed: Jun. 17, 1999

(51) Int. Cl.[7] .................................................. H04J 3/06
(52) U.S. Cl. ........................ 370/513; 370/350; 370/514; 370/516; 375/267; 375/299; 455/101; 455/133
(58) Field of Search ................................. 370/324, 350, 370/511, 513, 514, 516; 375/267, 299, 347, 365–366; 455/101, 133–135, 277.1

(56) References Cited

U.S. PATENT DOCUMENTS

| | | | |
|---|---|---|---|
| 4,829,543 A | 5/1989 | Borth et al. | |
| 4,849,991 A | 7/1989 | Arnold et al. | |
| 5,177,740 A | 1/1993 | Toy et al. | |
| 5,241,688 A | 8/1993 | Arora | |
| 5,299,235 A | 3/1994 | Larsson et al. | |
| 5,369,801 A | 11/1994 | Smith | |
| 5,488,638 A | * 1/1996 | Kazecki | ...................... 375/347 |
| 5,570,370 A | 10/1996 | Lin | |
| 5,657,325 A | 8/1997 | Lou et al. | |
| 5,666,366 A | 9/1997 | Malek et al. | |
| 5,680,421 A | 10/1997 | Shiino et al. | |
| 5,790,606 A | * 8/1998 | Dent | ........................... 375/348 |
| 5,802,044 A | 9/1998 | Baum et al. | |
| 5,940,454 A | * 8/1999 | McNicol et al. | ............. 375/347 |
| 6,121,927 A | * 9/2000 | Kalliojarvi | .................... 342/453 |
| 6,195,343 B1 | * 2/2001 | Watanabe | ................... 370/335 |

* cited by examiner

Primary Examiner—Kwang Bin Yao
Assistant Examiner—Thai D Hoang

(57) ABSTRACT

A computer implemented method and apparatus utilizing a multi-diversity synchronization technique for improving time synchronization in wireless applications, such as TDMA applications is disclosed. The multi-diversity synchronization technique utilizes cross-correlations between multiple diverse received signals to determine relative offsets between the signals. The signals are then time aligned. An absolute synchronization word location is determined using the time aligned signals and is used along with the relative offsets to determine respective synchronization word locations for each received signal in an accurate, efficient and improved manner.

27 Claims, 5 Drawing Sheets

MULTI-DIVERSITY SYNCHRONIZATION TECHNIQUE FOR IMPROVING SYNCHRONIZATION PERFORMANCE IN WIRELESS APPLICATIONS OVER FADING CHANNELS

BACKGROUND OF THE INVENTION

1. Field of the Invention

The present invention relates to the field of wireless telecommunications and, more particularly to a multi-diversity synchronization technique for improving synchronization performance in a wireless telecommunications application.

2. Description of the Related Art

In many wireless standards such as the TIA standard IS-136 format based on Time Division Multiple Access (TDMA) using Differential Quadrature Phase Shift Keying (DQPSK) modulation, a radio receiver is required to be able to derive timing synchronization from information contained in the received signal. Often there are a small number of data symbols contained in the transmitted signal that are known a priori to the receiver. The receiver may then use its knowledge of these symbols to locate them in the received transmission.

FIG. 1 illustrates a typical frame 10 within a transmitted signal according to the TIA standard IS-136 format. Each frame 10 is forty milliseconds in duration and consists of 1944 bits or 972 symbols (i.e., each symbol comprises 2 bits). Each frame 10 contains six time slots 20 of equal duration and size (i.e., 162 symbols), which include data from a plurality of signals transmitted by different mobile units to a base station or transmitted to a plurality of mobile units from the base station. Each full rate traffic channel uses the data fields in two time slots 20 (e.g., slots 1 and 4, 2 and 5, or 3 and 6) and thus, each frame supports three full rate traffic channels. A mobile unit will transmit or receive bursts of information, which are each allotted a time slot 20 in a frame 10, whereby a plurality of mobile units can transmit or receive over a given channel.

The format of a time slot 20 varies depending on whether it is transmitted by the base station or by a mobile unit. FIG. 2a illustrates the time slot 20 format of a signal transmitted from a mobile unit to a base station. The number of bits of each field are represented within parenthesis. The G field (6 bits) represents a guard time used to separate the present transmission burst from the previous burst. The R field (6 bits) represents a ramp time necessary to fully activate the radio transmitter. The three DATA fields (one field of 16 bits and two fields of 122 bits) hold the channel data, such as voice information. The SYNC field (28 bits) contains a sequence of symbols, which has been chosen to have good correlation properties and may be used, for example, in synchronization, equalizer training and slot identification. The SACCH (Slow Associated Control Channel) field (12 bits) is a signaling channel for transmission of control and supervision messages between the mobile units and the telecommunications system. The CDVCC (Coded Digital Verification Color Code) field (12 bits) is used to distinguish the current traffic channel from traffic co-channels.

FIG. 2b illustrates the time slot 20 format of a signal transmitted from a base station to a mobile unit. The number of bits of each field are represented within parenthesis. The SYNC, SACCH and CDVCC have the same number of bits and functions as described above with reference to FIG. 2a. There are only two DATA fields, however, each containing 130 bits, but they are still used to hold channel information, such as voice information. There is a RSVD field (1 bit) and a CDL (Coded Digits Control Channel Locator) field (11 bits), which may be used by the mobile unit to assist in the location of a Digital Control Channel.

Thus, in the TIA standard IS-136 format, there are twenty-eight known bits, or fourteen symbols, in each SYNC field (collectively referred to herein as the "synchronization word" or "sync word" for short) that may be used by the receiver to determine time synchronization. Typically, the receiver would correlate the received signal with the a priori known sync word and use the location of the maximum correlation to determine the absolute timing reference. Alternative measures of determining the similarity between the received signal and the known sync word such as the conventionally known Mean Squared Error (MSE) based metrics can also be used as the basis for locating the sync word in a received signal.

There are conflicting design goals that impact the selection of the contents of the sync word for a telecommunications system design. For reliable synchronization performance, the sync word should have good correlation properties (i.e., an autocorrelation function equal to zero for time offsets other than zero) and be as long as possible to average out the effects of noise in the synchronization process. For efficiency purposes, it is desirable to waste as few bits as possible on non-information carrying overhead symbols such as the symbols contained in the sync word. For practical real-world systems, the synchronization word is short enough that synchronization errors are a real concern, particularly in a fading environment where the effective Signal-to-Noise Ratio (SNR) can be locally very poor during a deep fade.

The consequences of incorrectly determining the position of the sync word can be severe. When a sync word location is incorrectly determined in a burst transmission based TDMA system like IS-136 the entire frame of data contained in the mis-synchronized burst can be lost causing a significant degradation in Bit Error Rate (BER) or Frame Error Rate (FER) performance. This results in poorer speech quality in voice applications, or reduced throughput in data applications. The problem can be particularly troublesome in a high mobility fading environment where the entire contents of an otherwise acceptable frame of data can be lost if a deep fade happens to hit the sync word symbols. With denser constellations such as, those being proposed in the IS-136+ enhancements to the TIA standard IS-136 format where coherent 8-PSK (Phase Shift Keying) modulation will be used, the tolerance for synchronization errors will be even less due to the reduced margin between adjacent symbols. Fractional symbol timing errors that caused little degradation with a widely spaced 4-point constellation will have a much more significant impact on the denser 8-point constellation of 8-PSK as the eye opening is not nearly as wide.

Wireless receivers designed to work in a fading environment, particularly base stations, often take advantage of antenna diversity (i.e., use of several antennas spaced apart for receiving diverse signals) in order to mitigate the effects of fading. Antenna diversity works by exploiting the fact that it is unlikely that fades will occur at the same time in all received signals (assuming the antennas are spaced far enough apart so that the fading processes are effectively independent), and hence there is better information in the combined signal than in any individual signal. As known in the art, Maximal Ratio Combining (MRC), where the diverse signals are weighted proportionally to their received energy, is an example of a method for combining multiple antenna signals to improve receiver performance.

A high level functional block diagram of a typical synchronization scheme 50 is illustrated in FIG. 3. Baseband signals $r_0$ to $r_{L-1}$ are received from signal receiving circuitry (not shown). Each baseband signal $r_0$ to $r_{L-1}$ was originally received as a radio frequency (RF) signal from its respective antenna and converted by the signal receiving circuitry into digitized baseband signals (having complex in-phase I and quadrature Q components). Here the sync word positions are independently located in their individual diversities by separate single diversity sync locators $52_0$ to $52_{L-1}$ (where L is the number of antennas or diversities). Once the locations $S_0$ to $S_{L-1}$ of the sync words have been determined, the baseband signals $r_0$ to $r_{L-1}$ may be combined in a multi-diversity demodulator 54 that can make use of the combined information found in the multiple diversities to output information OUTPUT BITS to be used by the remainder of the receiver.

Synchronization schemes, such as the one illustrated in FIG. 3, have not made use of antenna diversity since it is necessary that the signals from the multiple antennas be time aligned and coherent before they can be combined. That is, the sync word in each of the individual signals must be made to line up in time. Moreover, for phase-only modulation systems, the phase errors attributable to the fading phenomenon must be taken into account so that the multiple received signals can be combined in a constructive manner. If amplitude modulation is involved, such as when Quadrature Amplitude Modulation (QAM) constellations are used, the instantaneous amplitude error attributable to fading must also be compensated for prior to combining the multiple signals.

Currently, antenna diversity techniques are not being applied to the synchronization process. This is due to an apparent conflict that would seem to imply that antenna diversity cannot be applied to help synchronization performance because of the need to have the signals already synchronized before they can be combined. It is desirable, however, to use an antenna diversity technique (hereinafter referred to as a "multi-diversity" technique) in the synchronization process to help synchronization performance in wireless telecommunications applications, such as TDMA applications.

SUMMARY OF THE INVENTION

In view of the foregoing shortcomings, and for other reasons, the present invention is directed to conducting time synchronization on received signals in a manner that reduces potential synchronization errors typically attributable to fading environments and the use of small synchronization words. The present invention comprises a method and apparatus utilizing a multi-diversity synchronization technique for improving time synchronization in wireless applications, such as TDMA applications.

In one aspect of the present invention, a method of performing time synchronization on a plurality of received signals in a telecommunications system is provided. The method includes the steps of: selecting one of the plurality of received signals to be a reference signal; estimating respective cross-correlation functions between the reference signal and each received signal not being used as the reference signal; determining respective offsets between the reference signal and each received signal not being used as the reference signal; time aligning the plurality of received signals; determining a first synchronization word location from the time aligned signals; and determining a synchronization word location for each received signal based upon the first synchronization word.

In another aspect of the present invention, a method of demodulating a plurality of received signals in a telecommunications system is provided. The method includes the steps of: determining respective synchronization word locations for each received signal using a multi-diversity synchronization method; and demodulating the received signals based upon the determined synchronization word location for each received signal.

In yet another aspect of the invention, a receiver for a telecommunications system is provided. The receiver includes a controller, said controller receiving a plurality of signals, each of the plurality of received signals comprising a synchronization word, said controller for selecting one of the plurality of received signals to be a reference signal; estimating respective cross-correlation functions between the reference signal and each received signal not being used as the reference signal; determining respective offsets between the reference signal and each received signal not being used as the reference signal; time aligning the plurality of received signals; determining a first synchronization word location from the time aligned signals; and determining a synchronization word location for each received signal based upon the first synchronization word.

In yet a further aspect of the invention, a base station for a telecommunications system is provided. The base station includes a plurality of antennas, and a receiver, said receiver coupled to said plurality of antennas, and receiving signals from each antenna, each of the plurality of received signals comprising a synchronization word, said receiver comprising a controller, said controller for determining respective synchronization word locations for each received signal using a multi-diversity synchronization method; and demodulating the received signals based upon the determined synchronization word location for each received signal.

It is an object of the present invention is to provide an apparatus for improving time synchronization performance in a wireless telecommunications application using a multi-diversity synchronization technique.

It is a farther object of the present invention is to provide a method for improving time synchronization performance in a wireless telecommunications application using a multi-diversity synchronization technique.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Although the TIA standard IS-136 format has been selected to illustrate the present invention, those skilled in the art will recognize that the multi-diversity synchronization technique disclosed herein may be applied to data transmitted in any format. Thus, the present invention is not to be limited solely to the TIA standard IS-136 format for TDMA applications.

Figure 1:
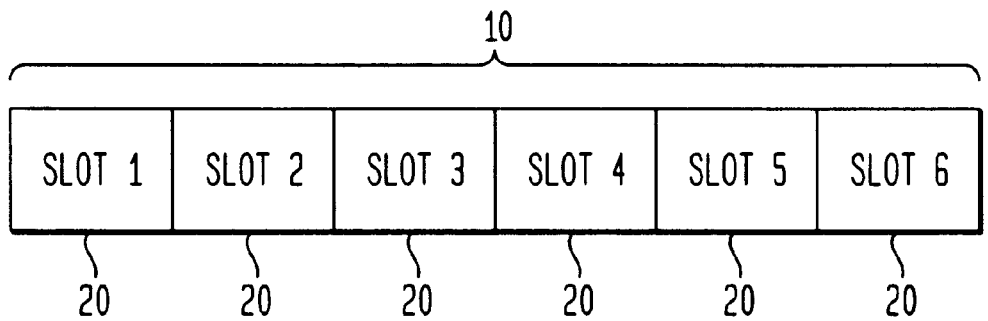
FIG. 1 illustrates a typical frame format in a received signal processed by the present invention.
Figure 2A:
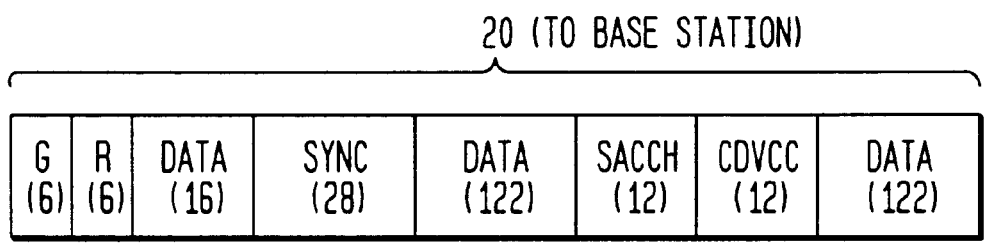
FIG. 2a illustrates a detailed slot format of a typical signal received by a base station.
Figure 2B:
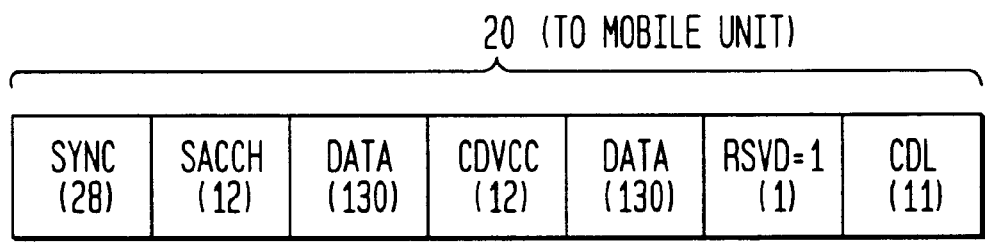
FIG. 2b illustrates a detailed slot format of a typical signal received by a mobile unit.
Figure 3:
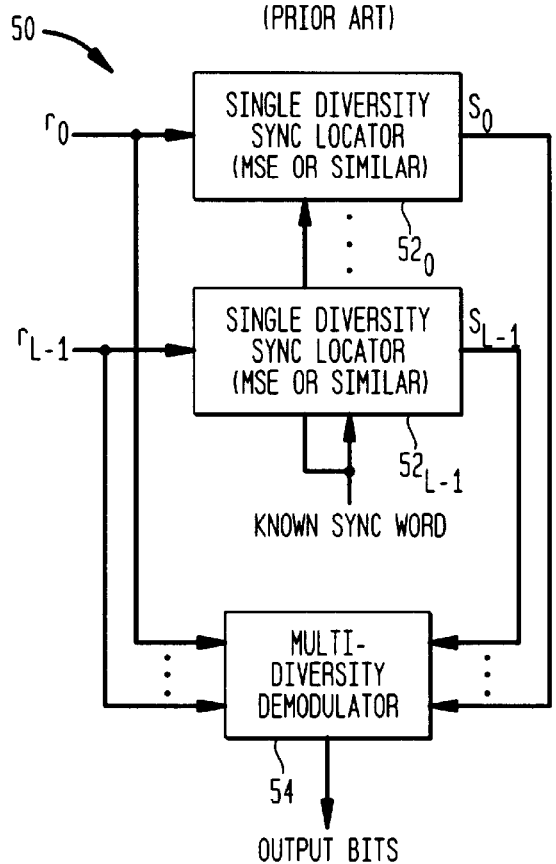
FIG. 3 illustrates a high level functional block diagram of a typical synchronization scheme.
Figure 4:
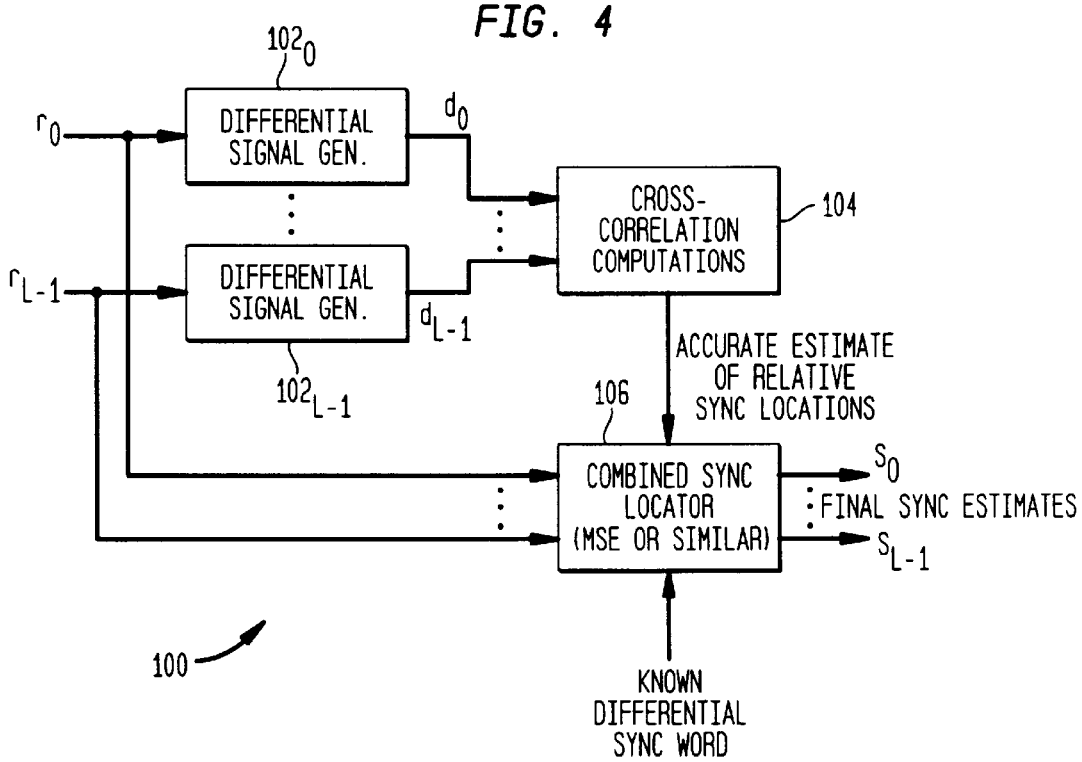
FIG. 4 illustrates a high level functional block diagram of a multi-diversity synchronization scheme constructed in accordance with the present invention.

Referring now to the drawings where similar reference numerals designate like elements, there is shown in FIG. 4 an exemplary high level functional block diagram of a multi-diversity synchronization technique 100 constructed in accordance with the present invention. As will be discussed below, the technique 100 will utilize the signals received from multiple antennas/diversities (where L is the number of antennas/diversities) to determine the synchronization word locations of the individual diversities. The use of information from the multiple diversities improves synchronization performance, i.e., reduces errors attributable to fading on a single diversity, since there is better information in the combination of the signals than in any individual signal.

Prior to discussing the technique 100, there are a number of observations that must be made: (1) it is not necessary to know the absolute synchronization of the different antenna signals in order to combine diversities, but rather only the relative timing offsets between signals; (2) the same data symbols are received by all antennas for the entire duration of the transmission; (3) if the changes in the fading processes are small between successive samples, then using a differential signal can greatly reduce the effects of fading (this applies to DPSK signals as well as straight PSK signals); and (4) a correlation estimation or MSE calculation will be more accurate if averaging can be carried out over a larger number of terms to smooth out the effects of noise.

The technique 100 operates on baseband signals $r_0$ to $r_{L-1}$ that were originally received as RF signals from respective antennas and converted by signal receiving circuitry into digitized baseband signals (having complex in-phase I and quadrature Q components). The key function performed by the technique 100 is the estimation of cross-correlation functions between signals from different antennas (illustrated by the cross-correlation computations function 104). Differential signals $d_0$ to $d_{L-1}$ (produced by the differential signal generation functions $102_0$ to $102_{L-1}$) are used during the cross-correlation computations function 104 (and following functions) to reduce the effects of fading, but are otherwise not required. Since these cross-correlation functions are being estimated for signals with identically sourced signals $d_0$ to $d_{L-1}$, the estimation can be done over the entire transmission (or as much of the burst as needed) resulting in a much more precise estimate than otherwise would be obtained by correlating one diversity branch at a time with a relatively short sync word sequence. The peak of these cross-correlation function estimates will then accurately determine the relative offsets between pairs of received signals.

After finding the relative offsets of all antenna diversities relative to one antenna signal arbitrarily chosen as the reference, the signals may be time aligned and sent to a combined diversity synchronization locating function 106 to determine the absolute sync word location in the combined signal. Any number of algorithms (MSE, correlation, etc.) may be used during this process. Using, the individual diversity offsets found during the cross-correlation computations, this single absolute sync word location found from the combined signal may be adjusted to produce the final absolute sync locations $S_0$ to $S_{L-1}$ in each of the individual diversities.

Figure 5:
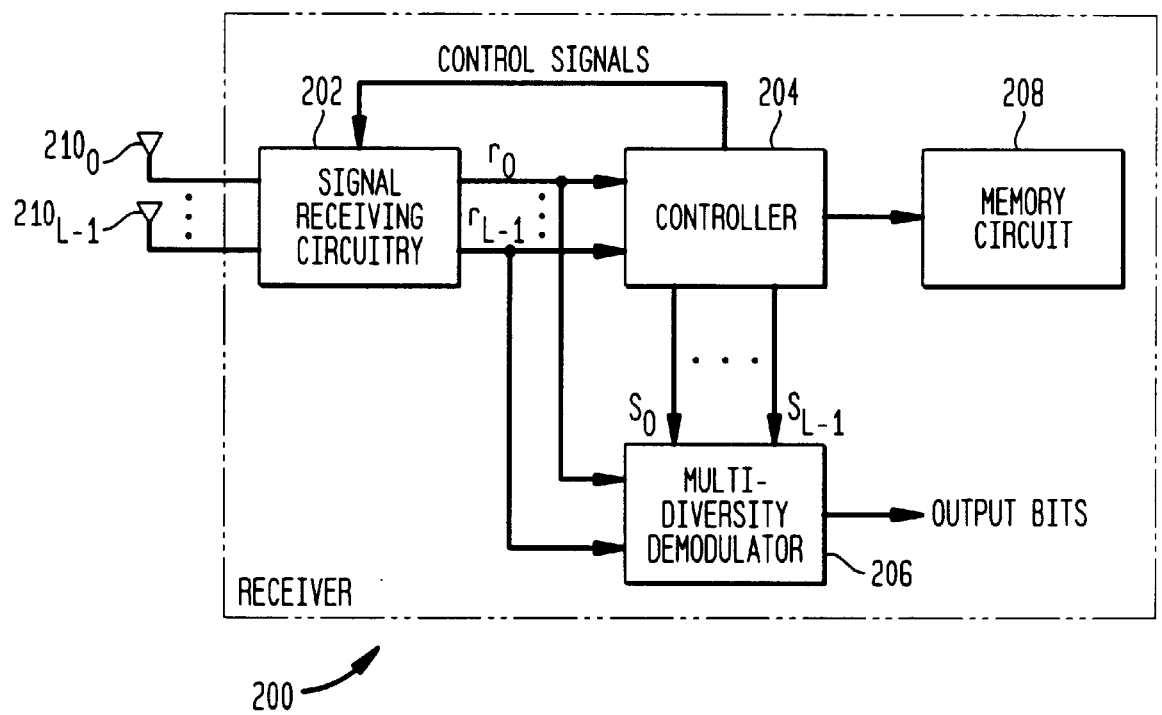
FIG. 5 illustrates an exemplary receiver for a wireless telecommunications system constructed in accordance with the present invention.
Figure 6:
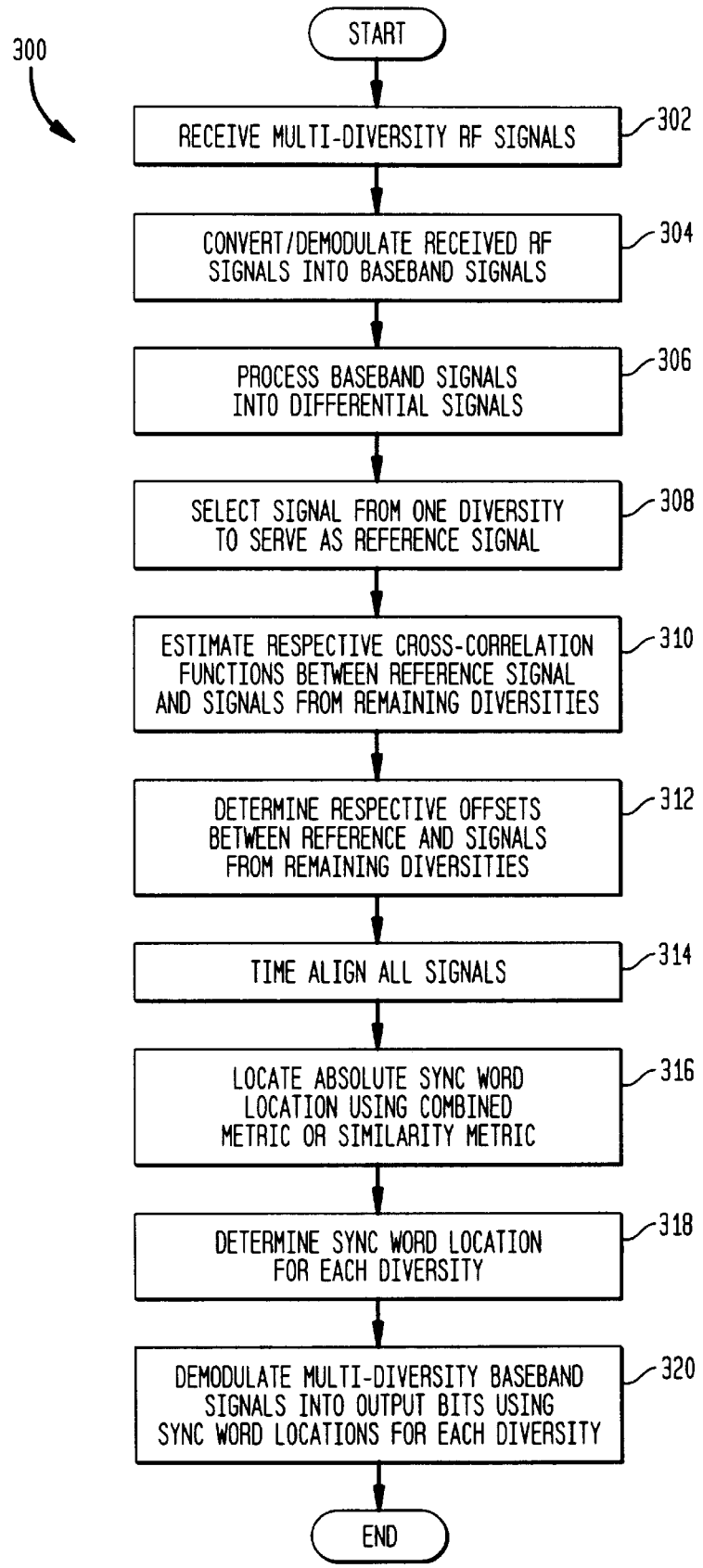
FIG. 6 illustrates in flow chart form an exemplary multi-diversity synchronization process constructed in accordance with the present invention.

FIG. 6 illustrates an exemplary multi-diversity synchronization process 300 implementing the multi-diversity synchronization technique 100 illustrated in FIG. 4. It is desirable that the method 300 be implemented in software and executed on a receiver of a base station in a TDMA telecommunications system. It should be noted, however, that it could be executed on a mobile unit receiver if the mobile unit utilizes antenna diversity (i.e., multiple antennas). It should be appreciated that the method 300 could be implemented in hardware, a combination of hardware and software or in an application specific integrated circuit (ASIC). FIG. 5 is a block diagram illustrating a portion of a receiver 200 for implementing the multi-diversity synchronization process 300 of the present invention. Prior to discussing the process 300 and receiver 200, the following definitions and information are provided.

It is presumed that a received baseband signal for the "l-th" diversity after receive filtering is represented by:

$$r_l(n)=h_l(n)s(n)+n_l(n), \qquad (1)$$

for l=0, . . . , L−1, where $h_l(n)$ is the multiplicative channel value for the l-th diversity path, s(n) is the transmitted complex symbol (i.e., data) and $n_l(n)$ is random noise and/or interference. It is presumed that the signals are sampled at an integral multiple of the symbol rate. That is, there are an integer number of samples every period. The index n indicates the multiples of the sample period. The differential signal for the l-th diversity can then be defined as:

$$d_l(n)=r_l(n+\Delta)r_l^*(n), \quad (2)$$

where * denotes the conjugate operation, $\Delta \geq 1$ is the differential interval and $\Delta$ corresponds to the time interval between the samples. If the 0-th diversity is arbitrarily chosen as the reference signal, an estimate of the cross-correlation function between the l-th diversity signal and the reference signal can be defined as:

$$x_l(k) = \frac{1}{N_x} \sum_{n=k_{\max}}^{N_x-1+k_{\max}}$$

$$d_0(n)d_l^*(n+k), \; -k_{\max} \leq k \leq k_{\max}, \quad (3)$$

where $k_{max}$ defines the range limits of the cross-correlation function and is chosen to account for the maximum relative delay that can occur between diversities and $N_x$ defines the number of terms used in the estimate. $k_{max}$ is typically a function of delay spread in the channel and possibly specific system design issues such as timing tolerances while $N_x$ is chosen as a trade-off between estimation accuracy (large value) and computational complexity (small value).

Given the complex cross-correlation functions for the L−1 non-reference diversities defined by equation (3), the locations of the maximum of the magnitude squared of each cross-correlation function $K_l$ may be found to determine the relative timing offset between the l-th diversity signal and the reference signal:

$$K_0=0 \text{ and} \quad (4)$$

$$K_l=\{k: |x_l(k)|^2 \geq |x_l(j)|^2 \; \forall j\}, \; l=1 \ldots, L-1. \quad (5)$$

Using the estimated relative offsets between diversities $K_l$ given by equations (4) and (5), a multi-diversity absolute synchronization finding procedure may now be defined. For example, a combined metric based on MSE can be defined as:

$$e(m) = \sum_{l=0}^{L-1} \sum_{n=0}^{N_s-1}$$

$$|r_l(N_0+K_l+m+(n+1)N_T)-r_l(N_0+k_l+m+nN_T)a_{n+1}a_n^*|^2, \quad (6)$$

where $N_0$ is the nominal starting sample to begin searching for the sync word, $N_S$ is the number of symbols to use in computing the MSE metric, $N_T$ is the number of samples per symbol period and $a_n$ is the n-th known sync word symbol. It should be noted that this metric weighs each diversity by the energy in that diversity and hence performs MRC. In a similar manner, an alternate correlation based similarity metric may be defined as:

$$c(m) = \sum_{l=0}^{L-1} \sum_{n=0}^{N_s-1}$$

$$r_l(N_0+K_l+m+nN_T)a_n^*|^2. \quad (7)$$

The absolute sync word location may then be determined from the location of the minimum of the MSE function defined by equation (6) using:

$$M=\{m:e(m) \leq e(n) \forall n\} \text{ and} \quad (8)$$

$$S_l=N_0+K_l+M, \text{ or alternatively,} \quad (9)$$

$M=\{m:c(m) \geq c(n) \forall n\}$ for the correlation case using equation (7).

Referring again to FIG. 5, the receiver 200 includes a signal receiving circuit 202, controller 204, memory circuit 208 and multi-diversity demodulator 206 connected in the conventional manner. The controller 204 may include a programmed microprocessor, digital signal processor or an application specific integrated circuit (ASIC). It is desirable that the controller 204 is a digital signal processor capable of being programmed to execute the process 300 (FIG. 6) of the present invention. The signal receiving circuit 202 may be a single circuit or multiple circuits capable of inputting RF signals from antenna units $210_0$ to $210_{L-1}$ and converting/demodulating the RF signals into baseband signals $r_0$ to $r_{L-1}$. It should be noted that the antenna units $210_0$ to $210_{L-1}$ can be provided internal to the receiver 200 if so desired. The memory circuit 208 may contain any data required by the controller 204 or the remainder of the receiver 200 and if the controller 204 is a processor capable of being programmed, the memory circuit 208 will contain the software instructions required to execute the process 300 (FIG. 6).

As known in the art, the controller 204 is coupled to the memory circuit 208 (or contains its own internal memory circuit) and is in communication with the signal receiving circuitry 202 and the demodulator 206. As is also known in the art, the controller 204 controls and coordinates the operations of the receiver 200 (via control signals) including, but not limited to, the inputting, converting/demodulating received RF signals and outputting of the output information (via the demodulator 206). With the provision of some additional software, the controller 204 will also implement the multi-diversity synchronization process 300 (FIG. 6) of the present invention. It must be noted that the exact architecture of the receiver circuitry 200 is not important as long as the technique 100 (FIG. 4) and process 300 (FIG. 6) of the present invention can be executed within the receiver.

Figure 7:
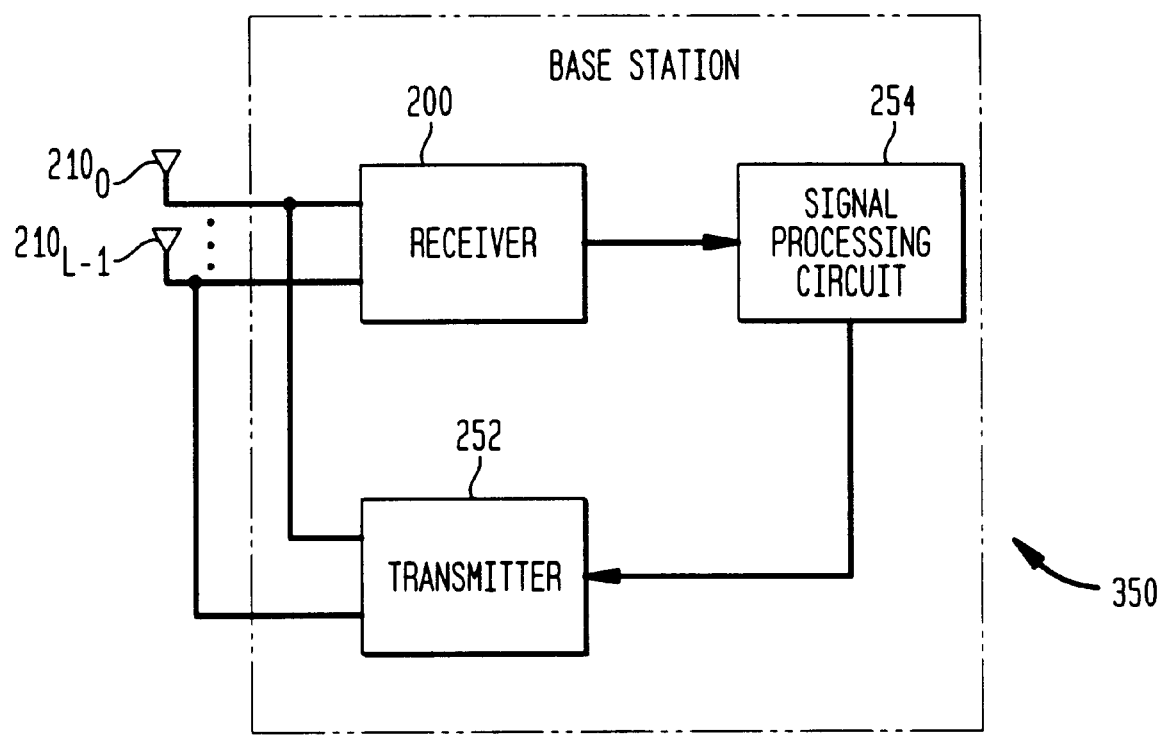
FIG. 7 illustrates an exemplary base station for a wireless telecommunications system constructed in accordance with the present invention.

FIG. 7 illustrates a base station 350 utilizing the receiver 200 constructed in accordance with the present invention. As is known in the art, the base station 350 would also contain a transmitter 252, which is also connected to the antenna units $210_0$ to $210_{L-1}$ (possibly through an RF switch, since the transmitter 252 typically transmits over only one antenna at a time) and signal processing circuitry 254. The receiver 200 would function as described with respect to FIG. 5 and would execute the multi-diversity synchronization process 300 (FIG. 6) of the present invention. It should be noted that some base stations utilize only one antenna to transmit signals and that often times this transmit antenna is separate and distinct from the antennas used to receive signals. Thus, it is possible for the transmitter 252 to have a separate antenna than the ones illustrated in FIG. 7. Again, it should be noted that the exact architecture of the base station 350 is not important so long as the process 300 of the present invention can be performed by the receiver 200.

Referring again to FIG. 6, the multi-diversity process 300 of the present invention begins when multi-diversity RF signals are received from the multiple diverse antennas connected to the receiver (step 302). Once received, the RF signals are converted and/or demodulated into digitized baseband signals at step 304 (containing complex I and Q components). The baseband signals are each processed into differential signals (at step 306). Once the all of the signals are processed into differential signals, one diversity and its signal is chosen to be a reference signal (step 308).

Once the reference signal is chosen, respective cross-correlation functions are estimated between the reference signal and each of the signals from the remaining diversities (step 310). The peak of the cross-correlation function estimates is now used to accurately determine the relative offsets between the reference signal and each of the signals from the remaining diversities (step 312). The signals are time aligned using the cross-correlation function estimates and offsets (step 314). The absolute sync word location is located from either the combined metric or similarity metric discussed above (step 316). Using the individual diversity offsets from step 312, the absolute sync word location is then used to determine the sync word location for each diversity (step 318). Having determined the sync word location for each diversity, the multi-diversity bandpass signals can be demodulated at step 320 into the output bits (i.e., voice or data information) and subsequently used by the remainder of the receiver circuitry.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of performing time synchronization on a plurality of received signals in a telecommunications system, each of the plurality of received signals comprising a synchronization word, said method comprising the steps of:
   selecting one of the plurality of received signals to be a reference signal;
   estimating respective cross-correlation functions between the reference signal and each received signal not being used as the reference signal;
   determining respective offsets between the reference signal and each received signal not being used as the reference signal;
   time aligning the plurality of received signals;
   determining a first synchronization word location from the time aligned signals; and
   determining a synchronization word location for each received signal based upon the first synchronization word.

2. The method of claim 1 wherein said step of determining a first synchronization word location is performed by computing a mean square error between data at possible synchronization word locations in the aligned signals and a predetermined synchronization word.

3. The method of claim 2 wherein the first synchronization word location is a location with data having a minimum mean square error with respect to the predetermined synchronization word.

4. The method of claim 3 wherein said step of determining a synchronization word location for each received signal comprises respectively adding a nominal starting sample to the first synchronization word location and to the respective relative offset of each received signal.

5. The method of claim 1 wherein said step of determining a first synchronization word location is performed by correlating data at possible synchronization word locations in the time aligned signals to a predetermined synchronization word.

6. The method of claim 5 wherein the first synchronization word location is a location with data having a maximum correlation to the predetermined synchronization word.

7. The method of claim 6 wherein said step of determining a synchronization word location for each received signal comprises respectively adding a nominal starting sample to the first synchronization word location and to the respective relative offset of each received signal.

8. The method of claim 1 further comprising processing each received signal into a differential signal prior to said step of selecting one of the plurality of received signals to be a reference signal and uses the differential signals to determine the synchronization word location for each received signal.

9. A method of demodulating a plurality of received signals in a telecommunications system, each of the plurality of signals comprising a synchronization word, said method comprising the steps of:
   selecting one of the plurality of received signals to be a reference signal;
   estimating respective cross-correlation functions between the reference signal and each received signal not being used as the reference signal;
   determining respective offsets between the reference signal and each received signal not being used as the reference signal;
   time aligning the plurality of received signals;
   determining a first synchronization word location from the time aligned signals;
   determining a synchronization word location for each received signal based upon the first synchronization word; and
   demodulating the received signals based upon the determined synchronization word location for each received signal.

10. The method of claim 9 wherein said step of determining a first synchronization word location is performed by computing a mean square error between data at possible synchronization word locations in the time aligned signals and a predetermined synchronization word.

11. The method of claim 10 wherein the first synchronization word location is a location with data having a minimum mean square error with respect to the predetermined synchronization word.

12. The method of claim 11 wherein said step of determining a synchronization word location for each received signal comprises respectively adding a nominal starting sample to the first synchronization word location and to the respective relative offset of each received signal.

13. The method of claim 9 wherein said step of determining a first synchronization word location is performed by correlating data at possible synchronization word locations in the time aligned signals to a predetermined synchronization word.

14. The method of claim 13 wherein the first synchronization word location is a location with data having a maximum correlation to the predetermined synchronization word.

15. The method of claim 14 wherein said step of determining a synchronization word location for each received signal comprises respectively adding a nominal starting sample to the first synchronization word location and to the respective relative offset of each received signal.

16. The method of claim 9 further comprising processing each received signal into a differential signal prior to said step of selecting one of the plurality of received signals to be a reference signal and uses the differential signals to determine the synchronization word location for each received signal.

17. A receiver for a telecommunications system, comprising:

a controller, said controller receiving a plurality of signals, each of the plurality of signals comprising a synchronization word, said controller for selecting one of the plurality of received signals to be a reference signal, estimating respective cross-correlation functions between the reference signal and each received signal not being used as the reference signal, determining respective offsets between the reference signal and each received signal not being used as the reference signal, time aligning the plurality of received signals, determining a first synchronization word location from the time aligned signals, and determining a synchronization word location for each received signal based upon the first synchronization word.

18. The receiver of claim 17 wherein said controller determines a first synchronization word location by computing a mean square error between data at possible synchronization word locations in the time aligned signals and a predetermined synchronization word.

19. The receiver of claim 18 wherein the first synchronization word location is a location with data having a minimum mean square error with respect to the predetermined synchronization word.

20. The receiver of claim 19 wherein said controller determines a synchronization word location for each received signal by respectively adding a nominal starting sample to the first synchronization word location and to the respective relative offset of each received signal.

21. The receiver of claim 17 wherein said controller determines a first synchronization word location by correlating data at possible synchronization word locations in the time aligned signals to a predetermined synchronization word.

22. The receiver of claim 21 wherein the first synchronization word location is a location having data with a maximum correlation to the predetermined synchronization word.

23. The receiver of claim 22 wherein said controller determines a synchronization word location for each received signal by respectively adding a nominal starting sample to the first synchronization word location and to the respective relative offset of each received signal.

24. The receiver of claim 17 wherein said controller further processes each received signal into a differential signal and uses the differential signals to determine a synchronization word location for each received signal.

25. The receiver of claim 17 wherein the controller is a programmed digital signal processor.

26. The receiver of claim 17 wherein said telecommunications system is a time division multiple access system.

27. A base station for a telecommunications system, comprising:

a plurality of antennas; and a receiver, said receiver coupled to said plurality of antennas, and receiving respective signals from each antenna, each of the plurality of received signals comprising a synchronization word, said receiver comprising a controller, said controller for selecting one of the plurality of received signals to be a reference signal, estimating respective cross-correlation functions between the reference signal and each received signal not being used as the reference signal, determining respective offsets between the reference signal and each received signal not being used as the reference signal, time aligning the plurality of received signals, determining a first synchronization word location from the time aligned signals, and determining a synchronization word location for each received signal based upon the first synchronization word.

* * * * *